US009467743B2

(12) United States Patent
Ruffini et al.

(10) Patent No.: US 9,467,743 B2
(45) Date of Patent: Oct. 11, 2016

(54) PERSONALIZED CONTENT AGGREGATION PLATFORM

(71) Applicant: Verizon Patent and Licensing Inc., Arlington, VA (US)

(72) Inventors: Michael P. Ruffini, Methuen, MA (US); John K. Trimper, Groton, MA (US); Sankar Subramanian, Ossining, NY (US); Joseph G. Fragale, Ridgewood, NJ (US); Dwight W. Fronsdahl, Groton, MA (US); Paul D. Heitlinger, Short Hills, NJ (US); Rahul Kher, Lexington, MA (US); Eric N. Klings, Freehold, NJ (US); Dongchen Wang, Concord, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 36 days.

(21) Appl. No.: 14/486,063

(22) Filed: Sep. 15, 2014

(65) Prior Publication Data

US 2016/0080815 A1  Mar. 17, 2016

(51) Int. Cl.
| | |
|---|---|
| *H04N 21/458* | (2011.01) |
| *H04N 21/475* | (2011.01) |
| *H04N 21/482* | (2011.01) |
| *H04N 21/472* | (2011.01) |
| *H04N 21/466* | (2011.01) |
| *H04N 21/462* | (2011.01) |
| *H04N 21/414* | (2011.01) |
| *H04N 21/443* | (2011.01) |
| *G06F 3/0486* | (2013.01) |

(52) U.S. Cl.
CPC .... *H04N 21/4755* (2013.01); *H04N 21/41407* (2013.01); *H04N 21/4438* (2013.01); *H04N 21/458* (2013.01); *H04N 21/4622* (2013.01); *H04N 21/4668* (2013.01); *H04N 21/47202* (2013.01); *H04N 21/4825* (2013.01); *H04N 21/4826* (2013.01); *H04N 21/4828* (2013.01)

(58) Field of Classification Search
CPC ..................... H04N 21/4755; H04N 21/4126
USPC ........................................... 725/46
See application file for complete search history.

(56) References Cited

U.S. PATENT DOCUMENTS

| | | | | |
|---|---|---|---|---|
| 7,650,361 B1 * | 1/2010 | Wong | ................ | G06F 17/30828 707/999.107 |
| 8,346,867 B2 * | 1/2013 | Sharkey | ................ | H04W 4/023 709/204 |
| 2005/0227218 A1 * | 10/2005 | Mehta | ...................... | G09B 5/00 434/350 |
| 2010/0299701 A1 * | 11/2010 | Liu | .................... | G06F 17/30053 725/39 |
| 2014/0282656 A1 * | 9/2014 | Belyaev | ........... | H04N 21/25841 725/14 |
| 2015/0135221 A1 * | 5/2015 | Gossweiler, III | ..... | G06F 3/0486 725/42 |
| 2015/0293928 A1 * | 10/2015 | Chen | .................... | G06F 17/3084 707/738 |

* cited by examiner

*Primary Examiner* — Nathan Flynn
*Assistant Examiner* — Caroline Somera

(57) ABSTRACT

A user device receives, from a network device, a content index of content items available for presentation via a content distribution network. The user device presents a user interface to configure a personalized channel plan and receives, via the user interface, user input to configure the personalized channel plan. The personalized channel plan includes a schedule of selected content items, from the content index, for presentation on a remote viewing device. The user device sends, to a remote viewing device, presentation instructions for the personalized channel plan, wherein the instructions cause the viewing device to present the selected content items to the user.

20 Claims, 12 Drawing Sheets

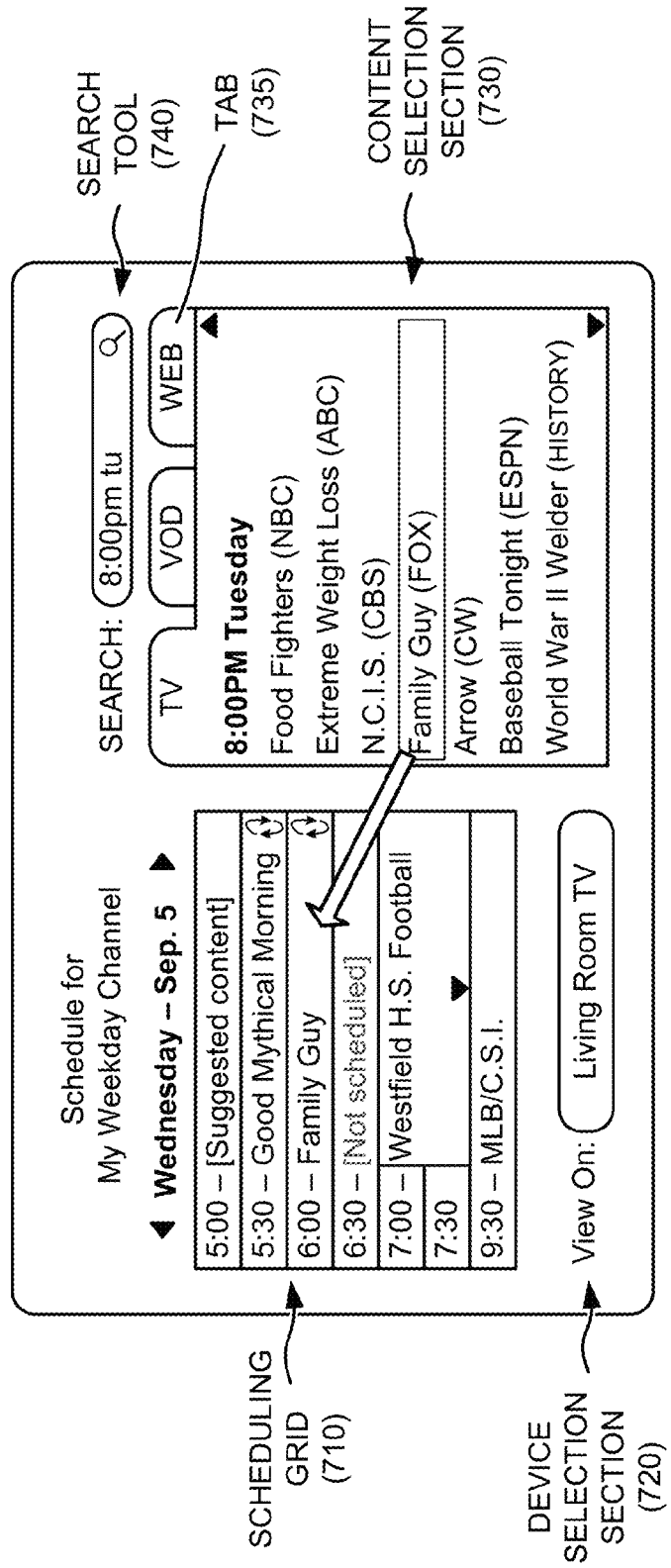

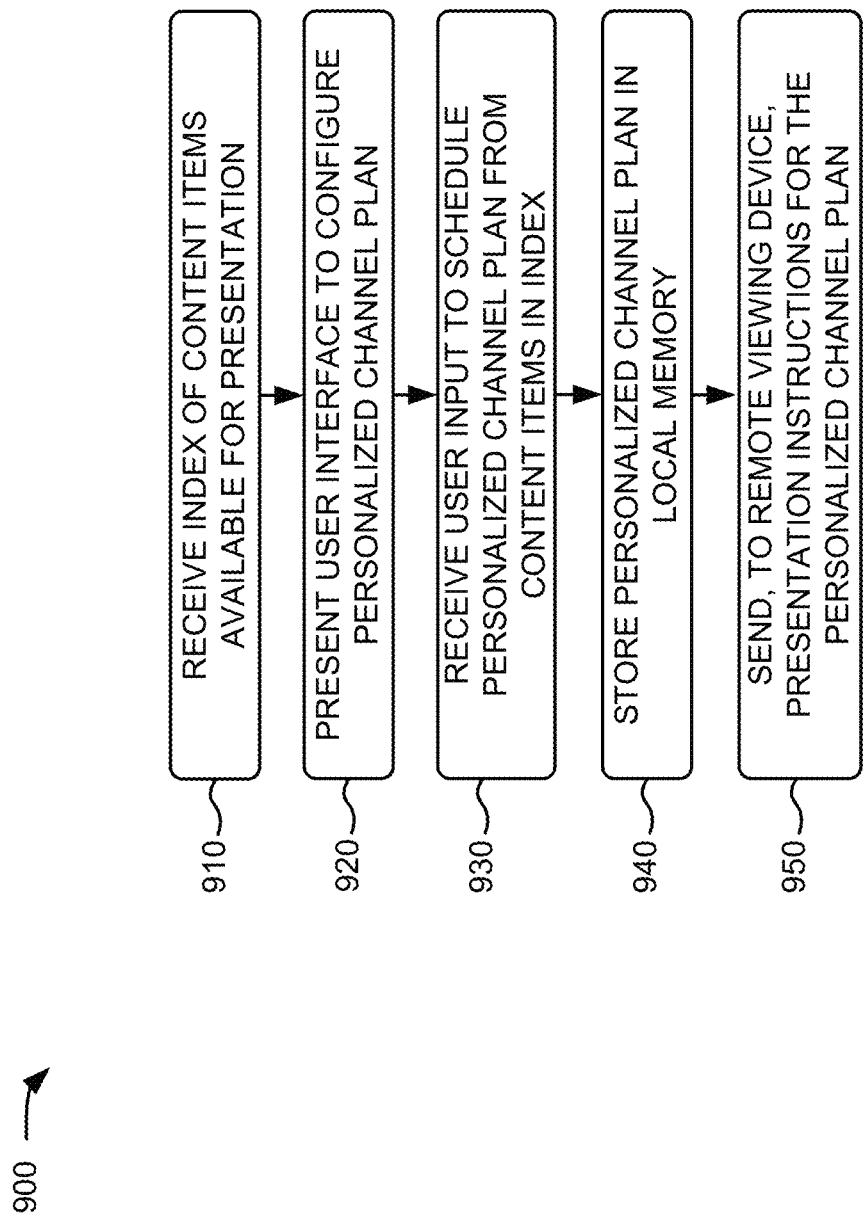

PERSONALIZED CONTENT AGGREGATION PLATFORM

BACKGROUND

Along with live linear television content, service providers also offer products that allow customers to download video content (e.g., streaming video, video files, etc.) on demand over a distribution network. Broadcast content options may be presented to the customer via an electronic program guide. Access to on-demand video content is typically presented to the customer via a catalog of available items. Customers may supplement consumption of live linear television and/or on-demand content with content available through various Internet web sites.

BRIEF DESCRIPTION OF THE DRAWINGS

FIG. 7 is an exemplary user interface for configuring a personalized channel according to an implementation described herein;

FIGS. 9 and 10 are flow diagrams of an exemplary process for configuring and presenting a personalized channel according to an implementation described herein.

DETAILED DESCRIPTION OF PREFERRED EMBODIMENTS

The following detailed description refers to the accompanying drawings. The same reference numbers in different drawings may identify the same or similar elements.

Systems and methods described herein may provide a personalized content aggregation platform. The personalized content aggregation platform enables users to configure personalized content schedules (also referred to herein as "personalized channel plans") from multiple content sources and/or for multiple types of content. In one implementation, the personalized channel plan may be configured using a navigation device (e.g., a tablet computer or smart phone), which may instruct a display device (e.g., a set-top box or smart television) to present the content for the personalized channel plan according to the configured time and sequence. In another implementation, the personalized channel plan may be shared with other users (e.g., via social media, etc.).

According to one implementation, a user device may receive, from a network device, a content index of content items available for presentation via a content distribution network. The user device may present a user interface to configure a personalized channel plan and may receive, via the user interface, user input to schedule the personalized channel plan. The personalized channel plan includes a schedule of selected content items, from the content index, for presentation on a remote viewing device. The user device may send, to the remote viewing device, presentation instructions for the personalized channel plan, and the instructions cause the viewing device to present the selected content items to the user.

Figure 1:
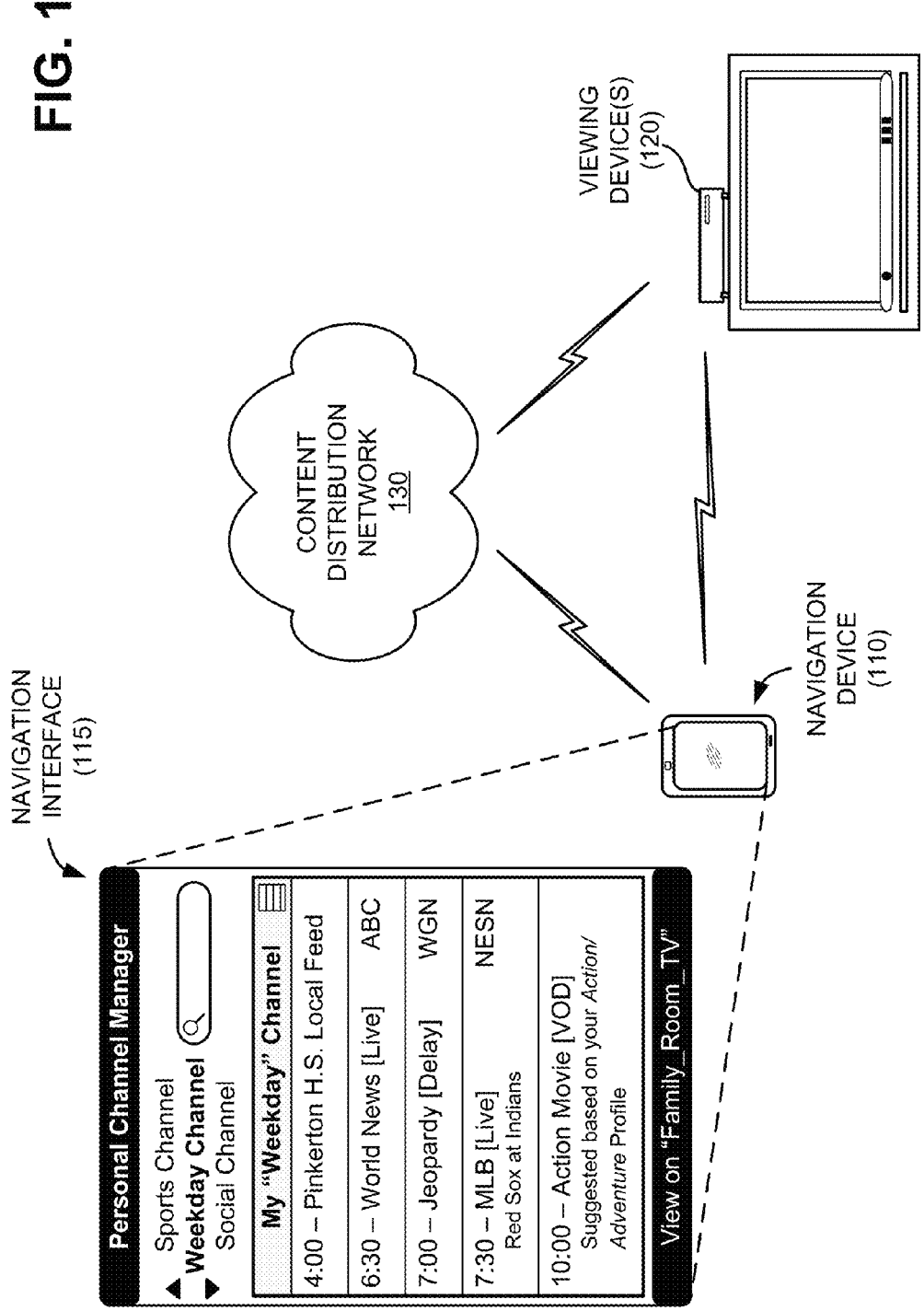
FIG. 1 is a diagram illustrating concepts described herein.

FIG. 1 is a diagram illustrating concepts described herein. A navigation device 110 (e.g., a tablet computer, smart phone, etc.) may be equipped with a personal channel manager application. As described further herein, the personal channel manager application may provide a channel configuration interface that enables a user to select a program schedule of linear and non-linear content from multiple sources. For example, navigation device 110 may obtain a catalog of available content from a content distribution network 130, which may be operated by a service provider that provides subscription-based services (e.g., television services, internet access services, and/or other telecommunications services). Available content may include for example, multiple linear television channels, video on demand (VOD) content, games, social media sites, video-sharing websites, etc.

For example, as shown in an exemplary navigation interface 115, a user may use the personal channel manager application on navigation device 110 to configure one or more personalized channels, including a "weekday" channel. To configure a channel, a user may select any available content (e.g., from a catalog from the content distribution network or another program guide) to fill available time slots. In the example of FIG. 1, the "weekday" channel may include a schedule that includes local programming (e.g., "Pinkerton H.S. Local Feed"), traditional network content (e.g., "World News" on ABC), basic subscription content (e.g., "Jeopardy" on WGN), premium subscription content (e.g., "MLB" on NESN), and VOD content in different time slots. The schedule of programming may include live linear broadcast content (e.g., "World News" on ABC) that corresponds to a regularly-scheduled program time and/or delayed programs (e.g., "Jeopardy" on WGN), which may be presented via the personalized channel on a delayed basis (e.g., at some scheduled time after the regularly-scheduled program time).

In another implementation, the schedule of programming may include on-demand content (e.g., VOD content) or non-linear content, such as social media content or games (not shown). As described further herein, the schedule of programming may also include content categories that may be filled with automatically-recommended content (e.g., based on user criteria, user profiles, channel metadata, and user metadata from other devices/accounts associated with the user). Thus, a scheduled time slot in a personal channel may include a place for an automated recommendation (e.g., "Action Movie") instead of a particular content title.

Navigation device 110 may also identify (or discover) available viewing devices 120 (such as a set-top box (STB) and/or television) on which content from personalized channels can be presented. For example, navigation device 110 may identify viewing devices 120 via local wireless networks (e.g., WiFi network, Bluetooth network, etc.). In one implementation, viewing devices 120 may be equipped with hardware and/or software to enable communication with navigation device 110. Using the personal channel manager application, a user may select a particular viewing device 120 on which to present content from a personalized channel, such as the "weekday" channel shown in FIG. 1.

According an implementation described herein, navigation device 110 may obtain, from content distribution network 130, links to content in the schedule of programming. For example, for the "weekday" channel, the personal channel manager application on navigation device 110 may obtain a separate link for each content item. Each separate link may be obtained either at the time of scheduling or at a point prior to the scheduled presentation time for the particular content. In one implementation, the link may provide a network location for content formatted particularly for a type of viewing device 120. As used herein, a "link" may generally refer to any pointer or instruction to identify a location, such as a uniform resource locator (URL), an Internet Protocol (IP) address, or channel indicator.

Navigation device 110 may provide links for content in the personal channels to viewing device 120 and control the presentation of content on viewing device 120. For example, navigation device 110 may cause viewing device 120 to access a particular link or "tune" to a particular broadcast channel at a particular time, according to the schedule of programming in the personalized channel. In one implementation, viewing device 120 may use links received from navigation device 110 to obtain content directly from content distribution network 130. For example, viewing device 120 may retrieve content via a dedicated access network, such as a closed cable and/or fiber optic distribution network, that can provide guaranteed quality of service (QoS) levels. In another implementation, viewing device 120 may use links received from navigation device 110 to obtain content via a public IP network or via navigation device 110. Thus, navigation device 110 may control viewing device 120 to present a personalized linear aggregation of programming (e.g., a personalized channel) that includes a variety of types of content from a variety of different sources, different broadcast channels (e.g., representing different television networks), and/or different network locations.

Figure 2:
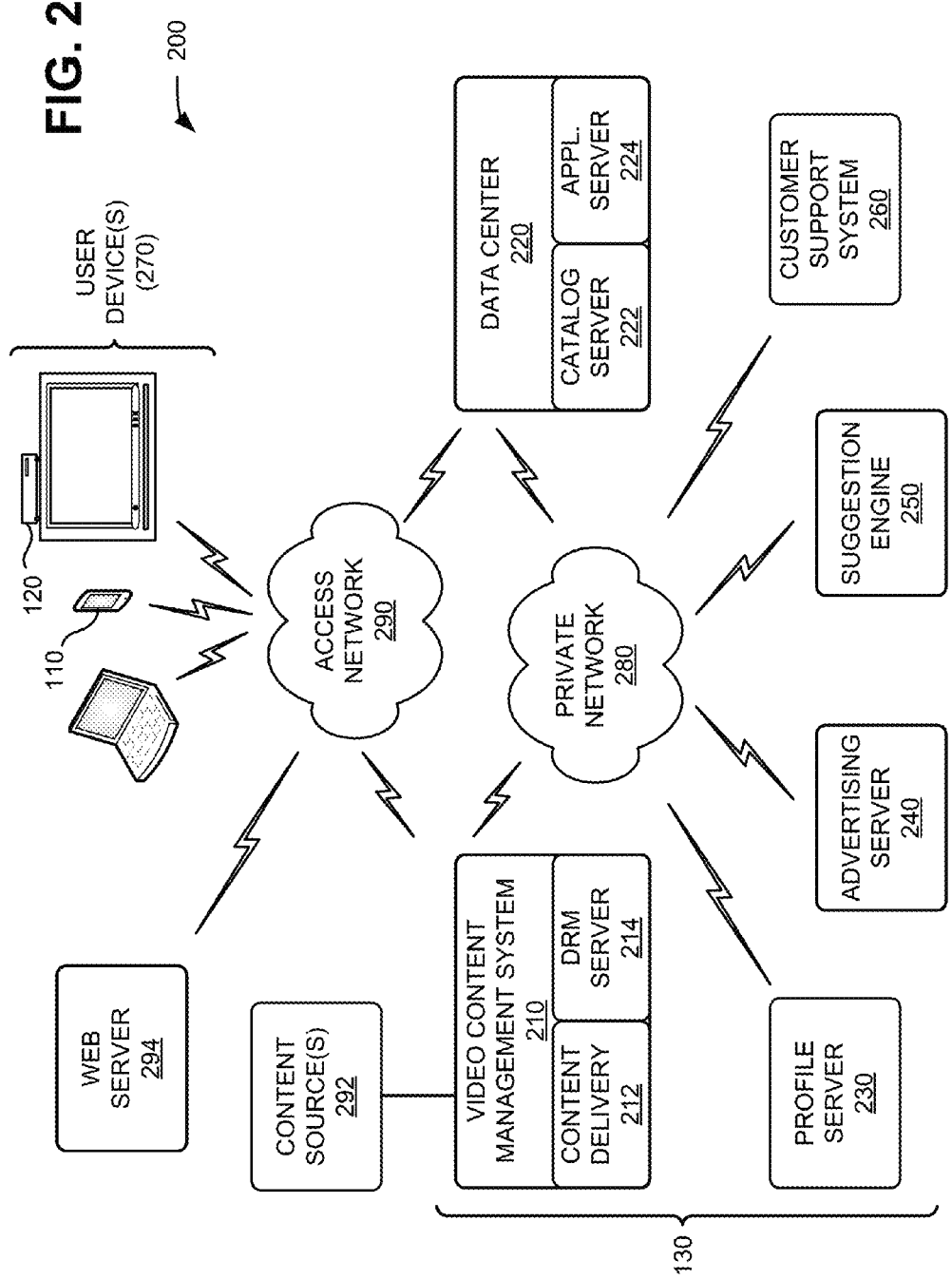
FIG. 2 is an exemplary network in which systems and/or methods described herein may be implemented.

FIG. 2 is an exemplary network 200 in which systems and/or methods described herein may be implemented. As illustrated, network 200 may include a video content management system (VCMS) 210, a data center 220, a profile server 230, an advertising server 240, a suggestion engine 250, a customer support system 260, user devices 270, a private network 280, an access network 290, content sources 292, and a web server 294. VCMS 210, data center 220, profile server 230, advertising server 240, suggestion engine 250, customer support system 260, and private network 280 may be part of content distribution network 130. The particular arrangement and number of components of network 200 shown in FIG. 2 are illustrated for simplicity. In practice there may be more VCMSs 210, data centers 220, profile servers 230, advertising servers 240, suggestion engines 250, customer support systems 260, user devices 270, networks 280/290, content sources 292, and/or web servers 294. Components of network 200 may be connected via wired and/or wireless links.

VCMS 210 may include one or more network devices, or other types of computation or communication devices, to aggregate content and content metadata, process content, and distribute content. In one implementation, VCMS 210 may include a content delivery system 212 and a digital rights management (DRM) server 214. VCMS 210 may aggregate content and transcode content into a digital format suitable for consumption on particular user devices 270. For example, VCMS 210 may include a transcoding device to convert a video file from one format to another (e.g., from one bit rate to another bit rate, from one resolution to another, from one standard to another, from one file size to another, etc.). VCMS 210 may also encrypt data and communicate with DRM server 214 to enforce digital rights.

Content delivery system 212 may include one or more network devices, or other types of computation or communication devices, to deliver multimedia content from a backend server to user devices 270. In one implementation, content delivery system 212 may include a streaming server that provides streaming data packets (e.g., via a streaming URL) to user devices 270 (e.g., via network 280). In one implementation, a streaming URL may be session-based, such that each URL can be used only once for one user device 270 for security purposes. In another implementation, content delivery system 212 may provide interactive content, such as games, etc.

DRM server 214 may include one or more network devices, or other types of computation or communication devices, to issue, validate, and/or enforce DRM licenses to a client, such as an application running on one of user devices 270. In implementations herein, DRM server 214 may communicate with user device 270 to authenticate a user of user device 270, the particular user device 270, and/or an application residing on user device 270. For example, DRM server 214 may request/receive login information associated with the user, and compare the login information with stored information to authenticate the user. Additionally, or alternatively, DRM server 214 may request/receive device information (e.g., a unique device identifier) associated with user device 270 and may compare the device information with stored information to authenticate user device 270.

Data center 220 may include one or more network devices, or other types of computation or communication devices, to manage the authorization, selection, scheduling, and/or purchase of multimedia content by a user of user devices 270. As shown in FIG. 2, data center 220 may include a catalog server 222 and an application server 224. In one implementation, data center 220 may be accessed by user devices 270 via access network 290.

Catalog server 222 may include one or more network devices, or other types of computation or communication devices, to provide a unified catalog of multimedia content for users (e.g., of user devices 270) to consume (e.g., view, buy, or rent). Catalog server 222 may include, for example, program guide data for television content, on-demand content data, games, etc. In one implementation, catalog server 222 may collect and/or present listings of content available to user devices 270. For example, catalog server 222 may receive content metadata, such as lists or categories of content, from VCMS 210. Catalog server 222 may use the content metadata to provide currently-available content options to user devices 270. Catalog server 222 may provide the content metadata to user devices 270 directly or may communicate with user devices 270 via application server 224.

Application server 224 may include one or more network devices, or other types of computation or communication devices (e.g., a server device, an application server device, a Web server device, a database server device, a computer, etc.), to provide a backend support system for mobile applications residing on user devices 270. For example, application server 224 may permit user devices 270 to download a personal channel manager application that may permit a user to find content of interest, schedule content presentation, and/or play downloaded or streaming content. The personal channel manager application may enable user devices 270 to present to a user of user device 270 information received from data center 220 in an interactive format to allow selection of particular multimedia content. Additionally, or alternatively, application server 224 may provide content metadata, such as lists or categories of content. Also, application server 224 may authenticate a user who desires to view, purchase, or rent multimedia content. In one implementation, the interactions between application server 224 and user device 270 may be performed using hypertext transfer protocol (HTTP) or secure HTTP (HTTPS) via access network 290.

Profile server 230 may include one or more network devices, or other types of computation or communication devices, to store user profile information for users (e.g., users of user devices 270). Profile server 230 may store per-user and/or per-device preferences. The user profile information may include various information regarding a user, such as login information (e.g., a user identifier and a password), billing information, address information, types of services to which the user has subscribed, parental control settings, preferred display format, subtitle defaults, relevant advertising settings, most-watched media, a list of multimedia content purchased by the user, user device identifiers (e.g., a media player identifier, a mobile device identifier, a set top box identifier, a personal computer identifier, etc.) for user devices 270 associated with a user, user content preferences, user tendencies, or the like. In one implementation, profile server 230 may include and/or access a database that includes user/device information from other systems, such as a wireless data service plan. Application server 224 may use the user profile information from profile server 230 to authenticate a user and may update the user profile information based on the user's activity (e.g., with a user's express permission).

Advertising server 240 may include one or more network devices, or other types of computation or communication devices, that store advertising content that may be delivered to user devices 270. The advertising content may include, for example, metadata that allows the advertising content to be associated with particular groups, categories, and/or profiles. The advertising content may include, for example, a unique identifier for each particular advertisement. In one implementation, advertising server 240 may provide advertising content for insertion into a content stream from VCMS 210.

Suggestion engine 250 may include one or more network devices, or other types of computation or communication devices, that provide suggestions and/or recommendations of specific content (e.g., TV programming, VOD titles, video games, etc.) based on user profiles (from profile server 230), user preferences (e.g., as indicated in a personal channel manager application), or other factors, such as popularity ratings for a show. In one implementation, suggestion engine 250 may provide a suggestion for a scheduled time slot in a personal channel. Suggestion engine 250 may also take into account subscription restrictions, pre-defined parameters set by parents, time-slot length, etc.

Customer support system 260 may include one or more network devices, or other types of computation or communication devices, to solicit and/or receive user feedback, questions, or credit-related requests. In one implementation customer support system 260 may include interfaces with data center 220 and/or a billing system, for example, to receive problem reports and to resolve customer billing disputes.

User devices 270 may generally include navigation devices 110, viewing devices 120, and other computing devices. Navigation device 110 may include a computation or communication device to enable a user to schedule presentation of content and/or interact with viewing device 120 to cause presentation of content. Navigation device 110 may include, for example, a personal communications system (PCS) terminal, a tablet computer, a smartphone, a personal computer, a laptop computer, a wearable computer, or other types of computation or communication devices. In one implementation, navigation device 110 may include a personal channel manager application that enables navigation device 110 to communicate with, for example, data center 220 and/or present information received from data center 220 to a user. The personal channel manager application may permit a user of navigation device 110 to log into an account (e.g., via application server 224), access catalog information (e.g., from catalog server 222), obtain content links to scheduled content, and/or provide presentation instructions to viewing device 120.

Viewing device 120 may include a device that can present content identified by navigation device 110. Viewing device 120 may include, for example, an STB (e.g., connected to a television), a gaming console, an Internet television, a smart television (e.g., a network-connected television), a computing device with a cable card, etc. Viewing device 120 may execute a host application to communicate via a local wired or wireless connection with navigation device 110. In one implementation, viewing device 120 may execute an application to communicate via access network 290 with, for example, VCMS 210 or web server 294 to present content based on instructions from navigation device 110. In another implementation, viewing device 120 may be equipped with a dongle to permit secure communications with a personal channel manager application on navigation device 110. In some instances, navigation device 110 and viewing device 120 may be combined in a single device.

Private network 280 may include, for example, one or more private IP networks that use a private IP address space. Private network 280 may include a local area network (LAN), an intranet, a private wide area network (WAN), etc. In one implementation, private network 280 may implement one or more Virtual Private Networks (VPNs) for providing communication between, for example, any of VCMS 210, data center 220, profile server 230, advertising server 240, suggestion engine 250, and/or customer support system 260. In one implementation, private network 280 may be protected/separated from other networks, such as access network 290, by a firewall. Although shown as a single element in FIG. 2, private network 280 may include a number of separate networks.

Access network 290 may include a local area network (LAN), a wide area network (WAN), such as a cellular network, a satellite network, a fiber optic network, a private WAN, or a combination of the Internet and a private WAN, etc. that is used to transport data. In one implementation, access network 290 may include a managed network that can be used to provide guaranteed service rates and QoS to user devices 270. Although shown as a single element in FIG. 2, access network 290 may include a number of separate networks that provide services to user devices 270.

Content sources 292 may include any type or form of content provider to provide content to VCMS 210 for distribution. For example, content sources 292 may include free television broadcast providers (e.g., broadcast providers, such as NBC, CBS, ABC, and/or FOX) and for-pay television broadcast providers (e.g., TNT, ESPN, HBO, Cinemax, CNN, etc.) that permit content to be streamed and/or downloaded. Content sources 292 may also include on-demand content providers (e.g., video on demand (VOD) providers, pay per view (PPV) providers, etc.), online content providers (e.g., webcasts, podcasts, etc.), etc.

Web server 294 may include one or more network devices, or other types of computation or communication devices, to receive provide information to user devices 270 and/or to receive information from user devices 270. In one implementation, web server 294 may be part of a social media platform to received and distribute files, such as a personalized channel plan, uploaded by a user of user device 270. In another implementation, web server 294 may include an internet content source, search engine, etc.

Figure 3:
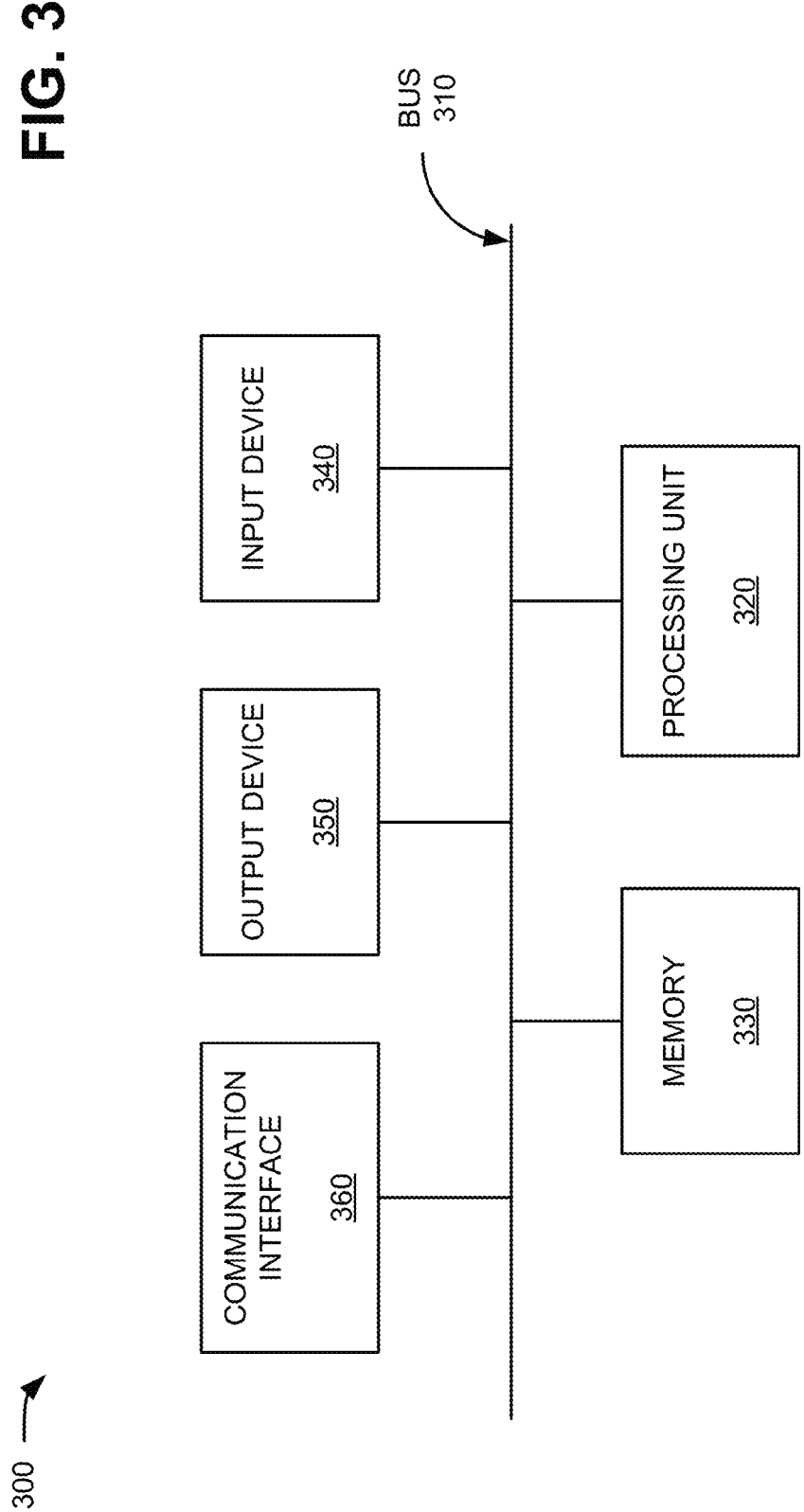
FIG. 3 is a block diagram of exemplary components of a device that may correspond to one of the devices of FIG. 2.

FIG. 3 is a diagram of exemplary components of a device 300. Each of VCMS 210, content delivery system 212, DRM server 214, data center 220, catalog server 222, application server 224, profile server 230, advertising server 240, suggestion engine 250, customer support system 260, user device 270, and web server 294 may be implemented/installed as software, hardware, or a combination of hardware and software, on one or more of device 300. In one implementation, device 300 may be configured as a network device. In another implementation, device 300 may be configured as a computing device. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include wired or wireless (e.g., radio frequency) mechanisms for communicating with other devices, such as other devices of network 200.

As described herein, device 300 may perform certain operations in response to processing unit 320 executing software instructions contained in a computer-readable medium, such as memory 330. A computer-readable medium may include a tangible, non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may include fewer components, different components, differently arranged components, or additional components than depicted in FIG. 3. As an example, in some implementations, a display may not be included in device 300. In these situations, device 300 may be a "headless" device that does not include an input device. Alternatively, or additionally, one or more components of device 300 may perform one or more other tasks described as being performed by one or more other components of device 300.

Figure 4:
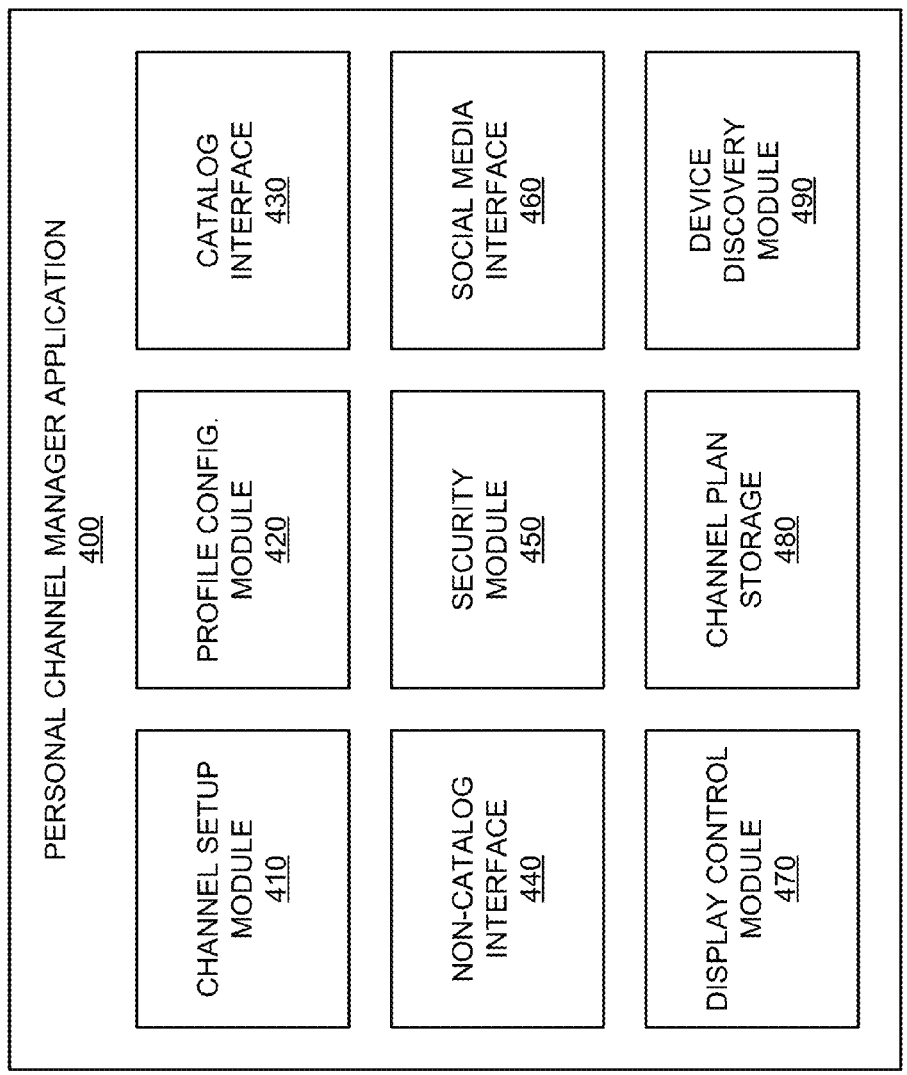
FIG. 4 is a block diagram of exemplary functional components of the navigation device of FIG. 1.

FIG. 4 is a block diagram of exemplary functional components of navigation device 110. The functions described in connections with FIG. 4 may be performed by one or more components of device 300 (FIG. 3), such as processing unit 320 executing instructions stored in memory 330. As shown in FIG. 4, navigation device 110 may include a personal channel manager application 400 that includes a channel setup module 410, a profile configuration module 420, a catalog interface 430, a non-catalog interface 440, a security module 450, a social media interface 460, a display control module 470, channel plan storage 480, and a device discovery module 490. Generally, personal channel manager application 400 may allow a navigation device 110 solicit a personalized content schedule and to direct presentation of the personalized content schedule on viewing device 120.

Channel setup module 410 may provide a user interface to present content options and configure a personalized content schedule. Content options may include, for example, items from catalog server 222, items from web server 294, and/or other multimedia content accessible via access network 290. In one implementation, channel setup module 410 may provide a grid of time slots that can be selectively filled in with content items from a catalog listing. For example, channel setup module 410 may include a drag-and-drop interface to insert content selections into a particular time slot in the grid. In one implementation, selected linear content (e.g., television content, VOD content, downloads, streaming media, etc.) may automatically fill an amount of time in the grid that corresponds to a selected program. In another implementation, selected non-linear content (e.g., games, music, social media, etc.) may be assigned a duration by the user. In still another implementation, a user may assign a default channel or content source for any time period not otherwise scheduled in the personalized content schedule. Items selected by the user and inserted into particular time slots may be associated with a personalized channel listing, such as shown in navigation interface 115 of FIG. 1.

Profile configuration module 420 may provide a user interface to solicit user preferences. For example, profile configuration module 420 may allow a user to provide definitive settings to guide/limit suggested content. Settings provided by a user may include, for example, user data (e.g., age, gender, etc.) and/or content preferences, such as content ratings (Motion Picture Association of America (MPAA) ratings, etc.), content age, favorite actors, preferred genres, minimum critic/viewer ratings, etc. In one implementation, profile configuration module 420 may communicate with profile server 230, advertising server 240, and/or suggestion engine 250 to allow content distribution network 130 to identify suggested content and/or advertising for a user's personalized channel.

Catalog interface 430 may allow navigation device 110 to obtain a list of available content (e.g., both linear and non-linear content) from data center 220 (e.g., catalog server 222). For example, catalog interface 430 may request, from data center 220, a list of content available for viewing/scheduling within a particular period. The list of content may be presented to a user of navigation device 110 via channel setup module 410. In one implementation, catalog interface 430 may indicate a user's selection/scheduling of particular content (e.g., via channel setup module 410) to data center 220 and, in return, receive a link to enable viewing device 120 to access the particular content. In some cases, catalog interface 430 may obtain session-specific information to access the particular content at a point in time prior to the scheduled time for presenting the particular content (e.g., as indicated by user input in channel setup module 410).

Non-catalog interface 440 may allow navigation device 110 to obtain a list of available content from web server 294 or other sources that may not be affiliated with service providers for content distribution network 130. For example, non-catalog interface 440 may request, from web server 294, a list of content available for viewing/scheduling. The list of content may be response to a particular search query and be presented to a user of navigation device 110 via channel setup module 410. In one implementation, non-catalog content (e.g., retrieved via non-catalog interface 440) may be listed along with catalog content (e.g., retrieved via catalog interface 430) within the user interface of channel setup module 410.

Security module 450 may restrict access to particular features, particular types of content, or particular times of use for personal channel manager application 400. Security module 450 may present a challenge event, such as soliciting a password, secret code, or input pattern to be input by a user. Security module 450 may provide a user interface to allow an authorized user to input configuration settings for personal channel manager application 400. For example, content with content rating levels exceeding a parental control threshold may not be displayed (e.g., via channel setup module 410) or may not be inserted into the time slot grid of channel setup module 410.

Social media interface 460 may provide an interface to a social media site to allow a user of personal channel manager application 400 to post/share a personalized content schedule (e.g., from navigation interface 115) or a list/link for content that is currently being presented via personal channel manager application 400. Social media interface 460 may communicate with, for example, web server 294 to upload a personalized content schedule from navigation device 110. Once available on social media, other contacts, for example, may access the schedule and use copies of personal channel manager application 400 on the contacts' devices to access the channel content.

Display control module 470 may communicate with viewing device 120 to present a personalized content schedule from channel setup module 410. In one implementation, display control module 470 may communicate with a host application executed on viewing device 120 to instruct viewing device 120 when and what channel/content to display. For example, display control module 470 may monitor the personalized content schedule and, depending on the type of content included in the current time slot of navigation interface 115, display control module 470 may instruct viewing device 120 to tune to a particular broadcast channel, load VOD content, or access a URL for web-based content.

In one implementation, display control module 470 may communicate with content distribution network 130 to obtain particular links (e.g., URLs) for content items in the personalized content schedule. For example, display control module 470 may monitor the personalized content schedule, retrieve one or more links to upcoming content, and provide the links to viewing device 120 for presentation according to the personalized content schedule. In another implementation, display control module 470 may provide actual content (e.g., from an item in the personalized content schedule) to viewing device 120 for presentation. For example, navigation device 110 may stream and/or download content and send the streamed/downloaded content to viewing device 120 for presentation.

Channel plan storage 480 may retrieve and/or store personalized content schedules. For example, channel plan storage 480 may store multiple personalized content schedules for a single user or for different users of navigation device 110.

Device discovery module 490 may identify viewing devices 120 that are available to present a personalized content schedule based on instructions from navigation device 110. In one implementation, device discovery module 490 may identify viewing device 120 via wireless network discovery protocols, such as WiFi protocols, Bluetooth protocols, or other wireless protocols. In another implementation, device discovery module 490 may apply additional application programming interfaces (APIs), protocols, and/or procedures to identify a type of viewing device 120. For example, device discovery module 490 may identify a display resolution (e.g., standard definition (SD) or high definition (HD) capable), platform (e.g., an operating system/device combination), and/or device type (e.g., an STB model, etc.) of viewing device 120.

Although FIG. 4 shows exemplary functional components of navigation device 110, in other implementations, navigation device 110 may include fewer components, different components, or additional components than depicted in FIG. 4. Alternatively, or additionally, one or more functional components of navigation device 110 may perform one or more other tasks described as being performed by one or more other functional components of navigation device 110. Furthermore, one or more functional components of FIG. 4 may be performed on a different user device 270. For example, in some implementations, channel setup module 410 may be accessed with user device 270 via a website account and the resulting personalized content schedule later retrieved/stored on navigation device 110.

Figure 5:
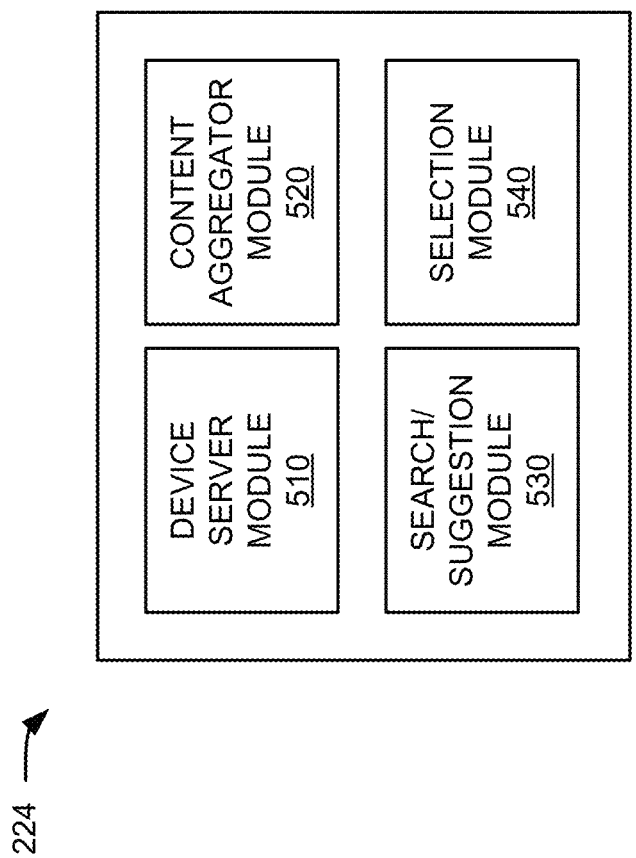
FIG. 5 is a block diagram of exemplary functional components of the application server of FIG. 2.

FIG. 5 is a diagram of exemplary functional components of application server 224. In one implementation, the functions described in connection with FIG. 5 may be performed by one or more components of device 300 (FIG. 3), such as processing unit 320 executing instructions store in memory 330. As shown in FIG. 5, application server 224 may include a device server module 510, a content aggregator module 520, a search/suggestion module 530, and a selection module 540.

Device server module 510 supports interactions between user devices 270 (e.g., navigation device 110 and/or viewing device 120) and backend servers, including (but not limited to) content delivery system 212, DRM server 214, and catalog server 222. Device server module 510 may determine which content format to use according a device type or platform of viewing device 120. For example, in one implementation, navigation device 110 may request, from application server 224, a streaming link for an item in a personalized content schedule just prior to a scheduled time slot. The request may include a content identifier and an identifier for viewing device 120. Device server module 510 may identify an appropriate format (e.g., bit rate, resolution, standard, file size, etc.) for the requested content on viewing device 120. Based on the selected content and format, device server module 510 may provide/generate a streaming link. Navigation device 110 may receive the streaming link and provide the streaming link to viewing device 120 to present the scheduled content. In another implementation, viewing device 120 may request the streaming link for the item in the personalized content schedule based on instructions from navigation device 110, and device server module 510 may provide the content link directly to viewing device 120.

Content aggregator module 520 aggregates information from Internet searching and social networks related to particular content (e.g., a program or video) for a user to include in a personalized channel. In one implementation, content aggregator module 520 may provide links or other menu options to enable a user to schedule content provided by content aggregator module 520.

Search/suggestion module 530 enables users to search the catalog by keywords. Search/suggestion module 530 may also provide ranked search results based on the user's search terms, profile, viewing history, or previously-purchased content. In one implementation, search/suggestion module 530 can also recommend particular content to the user based on input from suggestion engine 250.

Selection module 540 enables users to review and select content from a variety of sources, including items from catalog server 222 and content aggregator module 520. Selection module 540 may support browsing and searching of a customized content list (e.g., a unified catalog from catalog server 222 and content aggregator module 520) from navigation device 110/personal channel manager application 400. In one implementation, selection module 540 may include a customized content listing based on a user's subscription package with a service provider (e.g., a basic, extended, or premium service option). In another implementation, selection module 540 may include, in a customized content listing, other personalized channels from a user's social media contacts. In some implementations, selection module 540 may also provide an electronic shopping cart, transaction management, and/or promotions and advertisements.

Although FIG. 5 shows exemplary functional components of application server 224, in other implementations, application server 224 may include fewer components, different components, or additional components than depicted in FIG. 5. Alternatively, or additionally, one or more functional components of application server 224 may perform be performed by one or more other devices of content distribution network 130.

Figure 6:
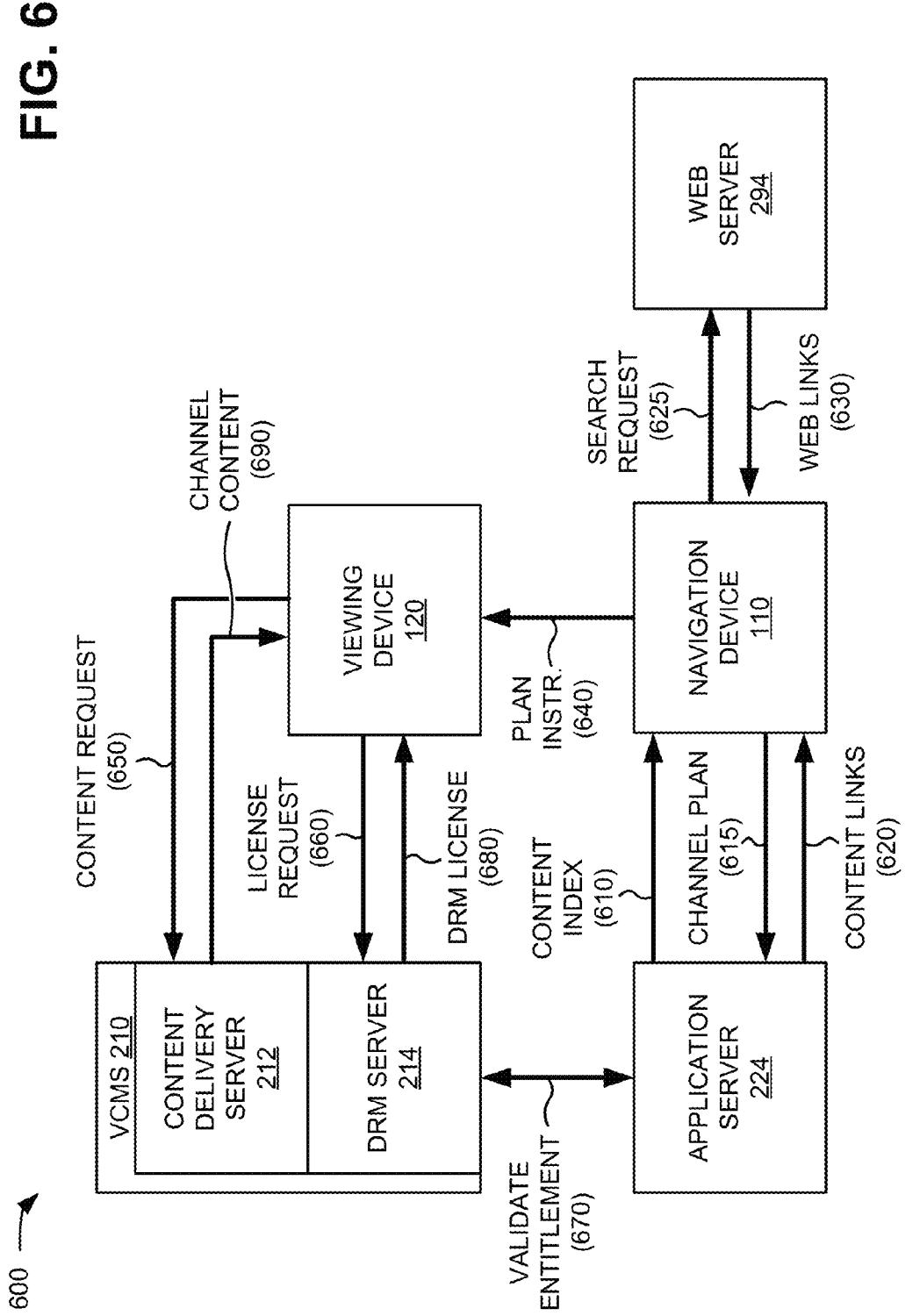
FIG. 6 is a block diagram of exemplary communications among devices in a portion of the network of FIG. 2.

FIG. 6 is a diagram of exemplary communications for a portion 600 of network 200. Communications in FIG. 6 may represent communication to configure, and view content from, a personalized channel according to implementations described herein. As shown in FIG. 6, network portion 600 may include navigation device 110, viewing device 120, VCMS 210 (including content delivery server 212 and DRM server 214), application server 224, and web server 294. Navigation device 110, viewing device 120, VCMS 210, content delivery server 212, DRM server 214, application server 224, web server 294 may include features described above in connection with, for example, FIGS. 1-5.

As shown in FIG. 6, application server 224 may provide a content index 610 to navigation device 110. Content index 610 may include, for example, items from catalog server 222 and/or content aggregator module 520. Navigation device 110 may receive content index 610, and the user of navigation device 110 may use personal channel manager application 400 (e.g., executing on navigation device 110) to configure a personalized channel using content items from content index 610. Based on the configured personalized channel, navigation device 110 may provide a channel plan 615 to application server 224. Channel plan 615 may include all or a portion of items from the personalized channel, a presentation schedule, a selected viewing device (e.g., viewing device 120), and/or a user identifier.

Application server 224 may receive channel plan 615 and may generate/assign content links 620 for the items in the personalized channel. The content links 620 may include a channel, IP address, URL, or another link to allow navigation device 110 or viewing device 120 to obtain and present content for items in the personalized channel. In one implementation, content links 620 may include a URL for a private managed network (e.g., a private portion of access network 290). Thus, if accessible to viewing device 120, a service provider may provide requested content with guaranteed QoS levels and/or other benefits that may not be available through a public network or with non-Guaranteed Bit Rate (GBR) traffic. For example, one or more of content links 620 may direct a device (e.g., viewing device 120) to a network location that is only accessible to particular devices (e.g., a proprietary STB) or particular accounts (e.g., subscribers with verified account credentials). In other implementations, one or more of content links 620 may provide unrestricted access to content.

Content links 620 may be provided to navigation device 110. In one implementation, application server 224 may provide content links 620 in a distributed manner. That is, at least some of content links 620 may not be defined/available within content delivery network 130 when channel plan 615 is initially sent to application server 224. Thus, navigation device 110 and application server 224 may perform multiple iterations of exchanging channel plan 615 and content links 620 over time. For example, navigation device 110 may provide channel plan 615 (and application server 224 may respond with a new content link 620) each time the personalized channel is scheduled to present a new content item.

Additionally, or alternatively, navigation device 110 may submit a search request 625 to web server 294. Web server 294 may provide access to, for example, links to internet-based content that is not included within content index 610. Search request 625 may include a keyword search, a category selection, or a particular link to identify content that may be included in a personalized channel. Web server 294 may receive search request 625 and, in response, provide web links 630 to access content item(s) responsive to search request 294.

Navigation device 110 may associate content links 620 and/or web links 630 with the particular sequence of content for the personalized channel defined by the user. Based on the schedule for the user's personalized channel, navigation device 110 may provide the content links 620 and/or web links 630 as plan instructions 640 to viewing device 120. Plan instructions 640 may include, for example, links to scheduled content and/or tuning instructions. Plan instructions 640 may be provided to viewing device 120 individually, in aggregation, or both individually and aggregated. For example, at the start of each new content item in the particular sequence of content for the personalized channel, navigation device 110 may provide, to viewing device 120, the next one of plan instructions 640 needed for the personalized channel. Alternatively, if viewing device 120 has the capability and when multiple links in a sequence are available, navigation device 110 may provide multiple plan instructions 640 (e.g., for several consecutive items) for the personalized channel.

In some instances, content associated with plan instructions 640 may be subject to copyright and/or license restrictions. Upon receiving plan instructions 640, viewing device 120 may access a streaming URL (e.g., in one of plan instructions 640) to request particular content from VCMS 210, as indicated by reference number 650. In response, VCMS 210 (e.g., content delivery system 212) may begin streaming the requested channel content 690, including a content header. A content header can include information about where to fetch a DRM license to permit viewing device 120 to display the channel content 690. Based on the content header, viewing device 120 may submit a license request 660 to VCMS 120 (e.g., DRM server 214) to retrieve the DRM license.

VCMS 210 (e.g., DRM server 214) may receive license request 660 and may communicate with application server 224 to validate the user's entitlement for the requested content, as indicated by reference number 670. If the validation is successful, VCMS 120 (e.g., DRM server 214) may return the DRM license 680 to viewing device 120. A DRM agent on viewing device 120 may validate DRM license 680 for viewing device 120, and viewing device 120 may play the channel content 690 if viewing device 120 is validated.

Although FIG. 6 shows exemplary communications within network portion 600, in other implementations, different communications may be used than depicted in FIG. 6. For example, in another implementation, plan instructions 640 may include a channel identifier that can be tuned to by viewing device 120 (e.g., when viewing device 120 includes a STB/TV combination). In still another implementation, plan instructions 640 may include an IP address for a web site that can be accessed via viewing device 120. In still another implementation, content associated with one or more of plan instructions 640 may be retrieved by navigation device 110 and the actual content may be sent through navigation device 110 for presentation on viewing device 120.

FIG. 7 is a schematic of an exemplary user interface 700 for configuring a personalized channel according to an implementation described herein. User interface 700 may be presented, for example, on navigation device 110 or another computing device. In one implementation, user interface 700 may be included as part of personal channel manager application 400. In another implementation, user interface 700 may be included in a web page accessible through a browser application.

As shown in FIG. 7, user interface 700 may include a scheduling grid 710, a device selection section 720, and a content selection section 730. Generally, scheduling grid 710 may provide a linear presentation of time slots that a user may fill in with content items to define a schedule for a personalized channel. Device selection section 720 may allow a user to select from available devices (e.g., viewing device 120) on which to present a personalized channel. In one implementation, device selection section 720 may present, for a user's selection, one or more devices that are discoverable (by navigation device 110) within a local wireless network, such as a LAN associated with a customer's home network/premises. Personal channel manager application 400 may use information in scheduling grid 710 and device selection section 720 to direct presentation of a personalized channel on viewing device 120.

Content selection section 730 may provide a searchable content index of items that may be used to fill in time slots of scheduling grid 710. The searchable content index may include items such as past and future television content (e.g., from multiple channels and/or broadcasters), VOD content, and web-based content. In the example of FIG. 7, different content types may be divided and searched under different tabs 735. In one implementation, searchable content index may be populated from content index 610, for example. A user may provide a search query into a search tool 740 to present a subset of content items in content selection section 730. Searches using search tool 740 may search various metadata to identify matches by genre, actors, channels, networks, broadcast times, etc. In the example of FIG. 7, the search term "8:00 pm tu" in search tool 740 may cause content selection section to present all content items (under "TV" tab 735) that are broadcast at 8:00 PM Tuesday (local time). Using, for example, a drag-and-drop motion, a user may select an item from content selection section 730 (e.g., "Family Guy (FOX)") to populate a time slot in scheduling grid 710 (e.g., Wednesday, September 5th, "6:00").

Items in each time slot of scheduling grid 710 may represent content items from any of a variety of sources and/or types. As shown in FIG. 7, at 5:00, "[Suggested content]" indicates a content item to be selected by content distribution network 130 (e.g., suggestion engine 250) based on a user profile and/or additional criteria. Recorded web-based content (e.g., "Good Mythical Morning") from an Internet site is scheduled for presentation at 5:30. At 6:00, previously-broadcast television content (e.g., "Family Guy") is scheduled for presentation from network-based content storage (e.g., content source 292). At 6:30, no content item is scheduled. Thus, at 6:30, personal channel manager application 400 may instruct viewing device 120 to present no content, present default content, or solicit user input to select content. Live web-based content (e.g., "Westfield H.S. Football") from a different Internet site is scheduled for presentation at 7:00.

As further shown in FIG. 7, alternate content (e.g., "MLB/CSI") is scheduled for the 9:30 time slot. Presentation criteria for alternate content may be configured by the user such that a primary content item will be presented for a time slot if certain conditions are met and an alternate content item will be presented if those certain conditions are not met. Additional time slots for scheduling grid 710 within the selected day (e.g., September $5^{th}$) may be accessed by scrolling up/down entries in scheduling grid 710. Additional days for scheduling grid 710 may be accessed by scrolling left/right.

Figure 8A:
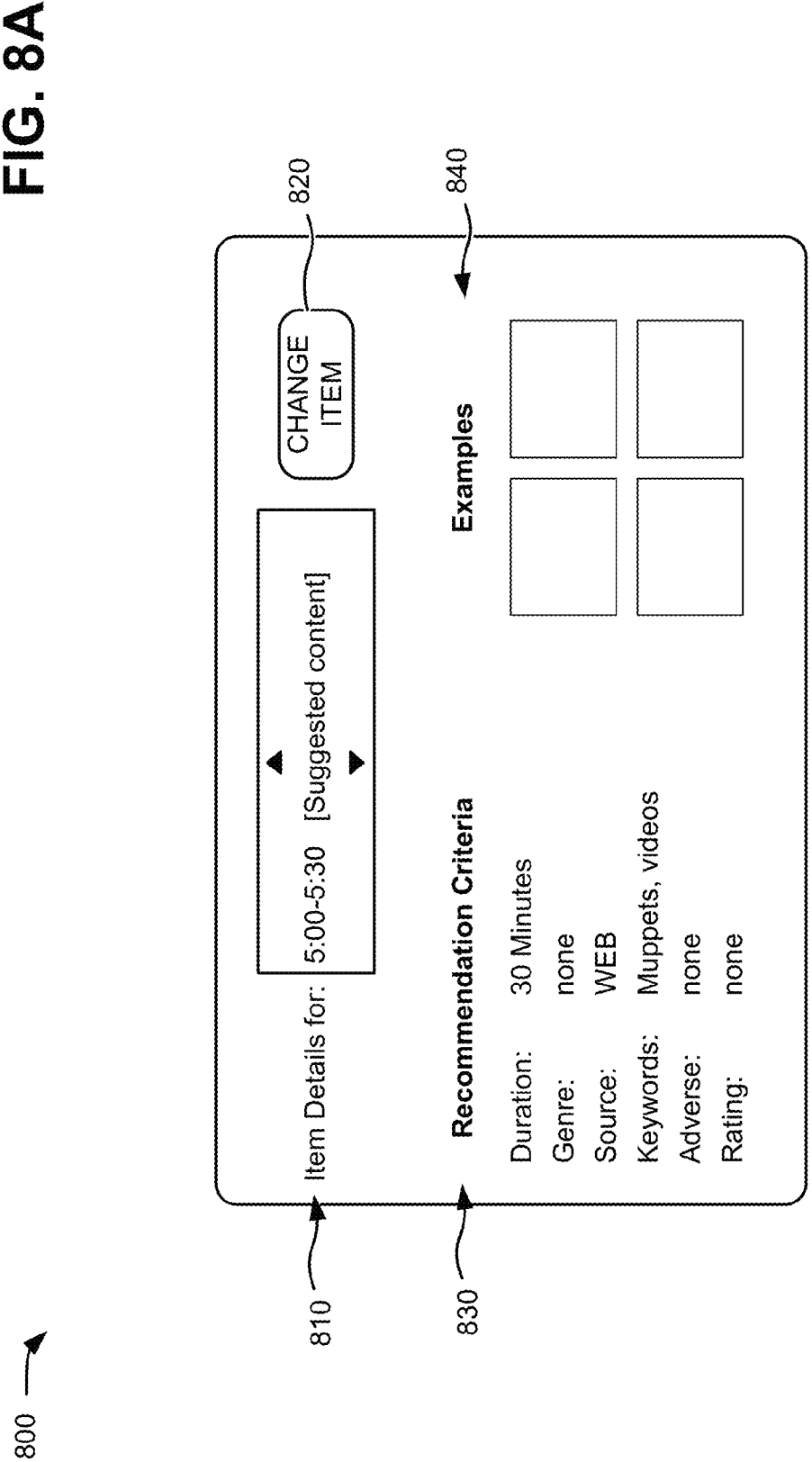
FIGS. 8A-8C are exemplary user interfaces for configuring a content item for a personalized channel according to an implementation described herein.
Figure 8B:
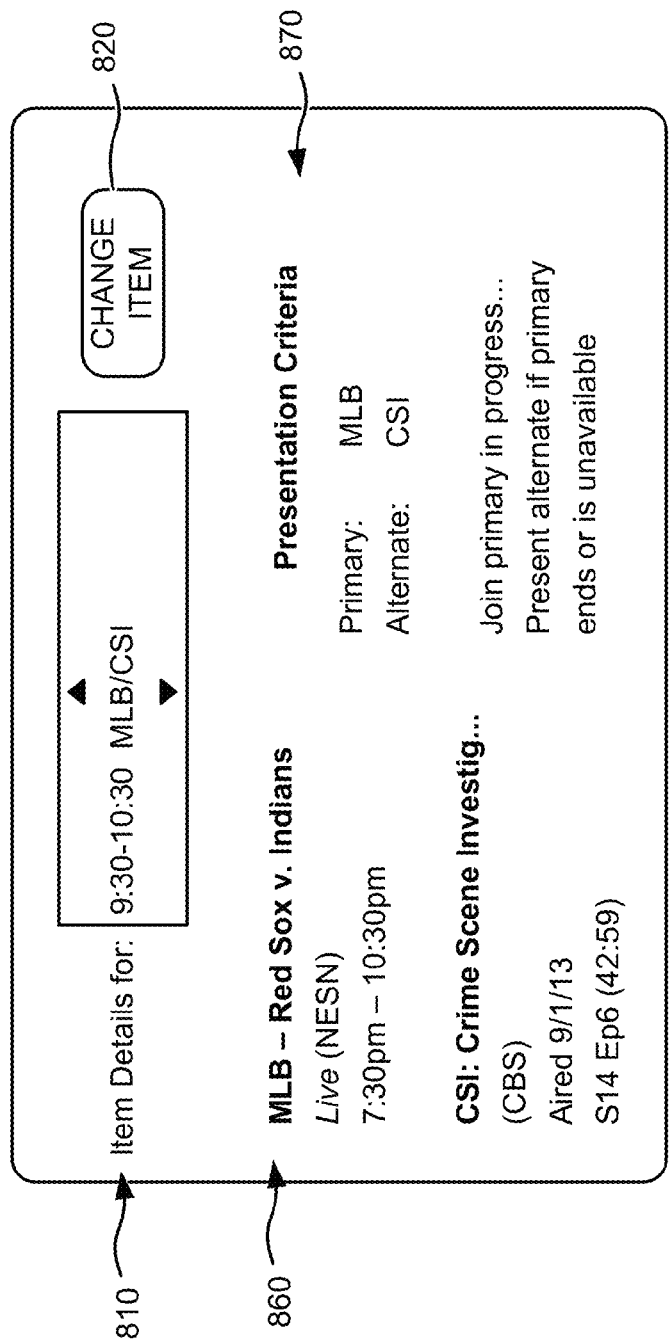
Figure 8C:
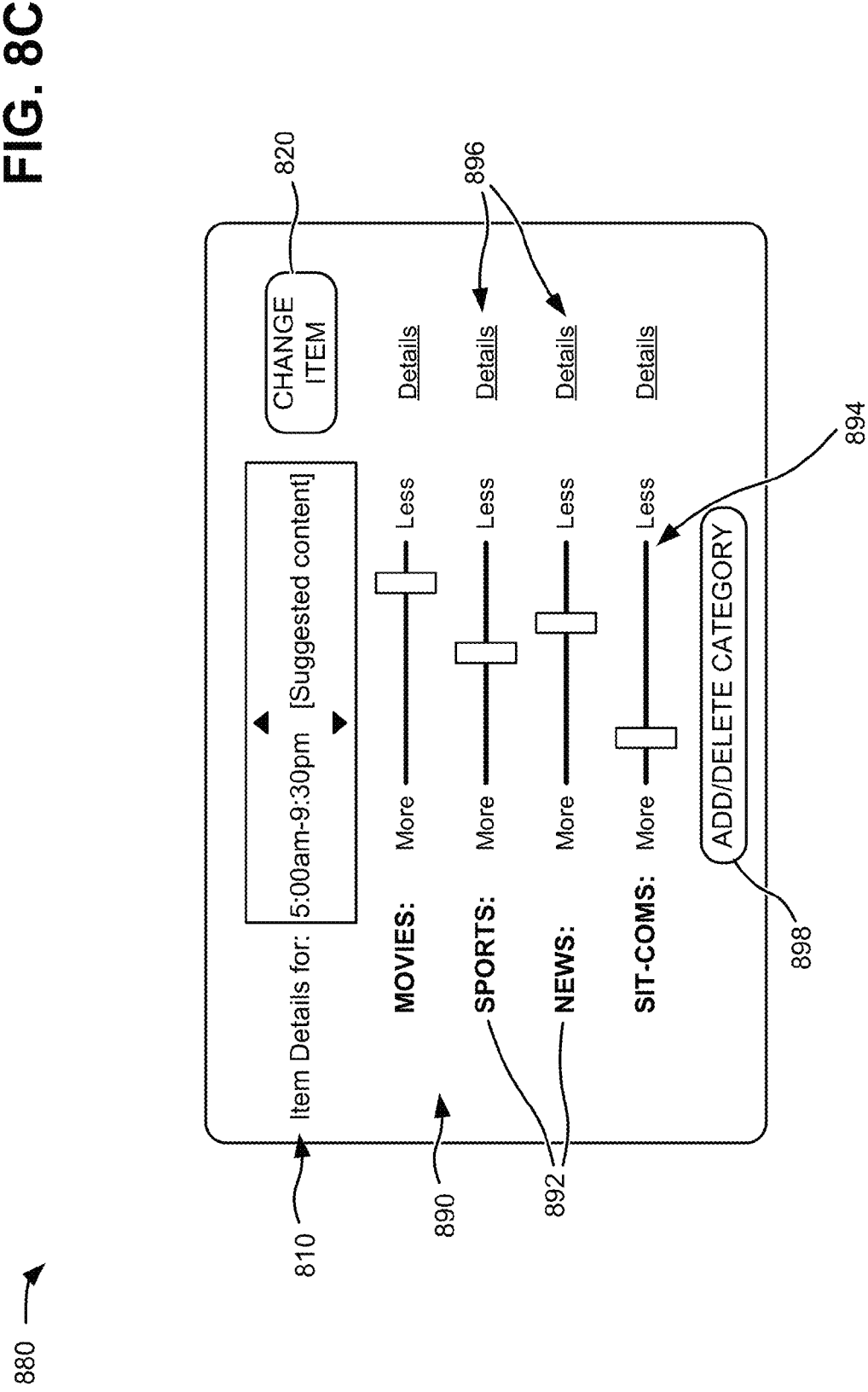

FIGS. 8A-8C are schematics of exemplary user interfaces for configuring a content item for a personalized channel according to an implementation described herein. FIG. 8A provides a user interface 800 for configuring suggested content. FIG. 8B provides a user interface 850 for configuring alternate content for a single time slot. FIG. 8C provides a user interface 880 for configuring suggested content according to another implementation. User interfaces 800/850/880 may be presented, for example, on navigation device 110 or another computing device when a user selects a particular content item from scheduling grid 710. Generally, user interfaces 800/850/880 may provide details of a scheduled content item (or items) and allow a user to modify presentation criteria for the content item (or items).

Referring to FIG. 8A, user interface 800 presents item details for a suggested content item (e.g., "5:00—[Suggested content]") from user interface 700. User interface 800 includes an item description section 810, a change item section 820, recommendation criteria section 830, and an examples section 840.

Item description section 810 may include an identifier for a selected content item, along with an assigned time slot, if applicable. Change item section 820 may provide a selection mechanism for a user to select a different content item for a particular time slot. For example, selection of the "Change Item" icon in section 820 may cause user interface 800 to present a content search interface (e.g., similar to content selection section 730 of FIG. 7) to select a different content item.

Recommendation criteria section 830 may provide details/guidelines associated with the suggested content item of item description section 810. In one implementation, recommendation criteria section 830 may be different for different instances of suggested content. That is, recommendation criteria for particular suggested content at 5:00 on Wednesday, September 5th may be different than recommendation criteria for suggested content scheduled at a different time/day. Recommendation criteria section 830 may include user-configurable settings to govern automatic selection of particular content, such as a duration section, a genre section, a source section, a keywords section, an adverse section, and a rating section.

The duration section may include a configurable time period for the recommended content. For example, the duration section may set a maximum time window for a recommended content item or a group of recommended content items. The genre section may include a genre selection for the recommended content. In one implementation, selection of a genre may limit recommendations to content items including the selected genre in the content item metadata. The source section may include source options for the recommended content. Source options may include, for example, TV content, VOD content, web-based content, any content, or other content source classifications. The keywords section may include keywords associated with content metadata to trigger potential selection of recommended content. Keywords may include, for example, titles, actors, content descriptors, directors, networks, dates, studios, or any other type of keyword. Conversely, the adverse section may include keywords associated with content metadata to trigger rejection of recommended content. The rating section may include a rating level indicative of item content. Rating options may include, for example, MPAA ratings, TV Parental Guidelines ratings, and/or other rating systems for which a user can select a singular rating (e.g., only items with "PG-13" ratings) or a threshold rating (e.g., any item with a "PG" rating or a lower age-appropriate rating). Other criteria, such as critic/viewer reviews, popularity ranks, etc., may also be included in recommendation criteria section 830.

Examples section 840 may include descriptions, thumbnails, and/or icons that indicate representative types of content items that may meet the criteria in recommendation criteria section 830.

Referring to FIG. 8B, user interface 850 presents item details for alternate content items (e.g., "9:30—MLB/C.S.I.") from scheduling grid 710 of user interface 700. User interface 850 includes item details section 810 and change item section 820. Item details section 810 and change item section 820 may include features similar to those described above in connection with user interface 800 of FIG. 8A. The type of items (e.g., alternate content items) in item details section 810 may cause user interface 850 to present different information than presented in user interface 800. Thus, user interface 850 includes content summary section 860 and presentation criteria section 870.

Content summary section 860 provides additional information for each of the alternative content items identified in item description section 810. In the example of FIG. 8B, content summary section 860 describes two content items ("MLB—Red Sox v. Indians" and "CSI"). Additional descriptive information for each of the content items may be provided in content summary section 860, such as a source (e.g., TV network, internet site, VOD, etc.), a live/recorded indicator, a duration, etc.

Presentation criteria section 870 may allow a user to input criteria for selecting presentation of the alternate content items in item description section 810. For example, presentation criteria section 870 may identify a primary choice ("MLB") and a back-up choice (e.g., "CSI"). Presentation criteria section 870 may also identify criteria for automatically selecting between the primary choice and the secondary choice. For example, as shown in FIG. 8B, the presentation criteria for the items in item description section 810 would have personal channel manager application 400 direct presentation of the primary content item (e.g., a live MLB game that started at 7:30) joined in progress at 9:30. However, if the primary content item ends or is not available during the 9:30 to 10:30 time period (e.g., due to a blackout, cancelation, etc.), personal channel manager application 400 will direct presentation of the alternate content item (e.g., CSI). In other implementation, a user may define different criteria for automatically selecting between presentation of alternate content items.

Referring to FIG. 8C, user interface 880 presents item details for a block of time that may include multiple suggested content items (e.g., "5:00 am-9:30 pm [Suggested content]"). The block of time may be identified using user interface 700 or another user interface. In another implementation, user interface 880 may not define a particular time, and may instead apply user input to all programming for a particular personalized channel. As shown in FIG. 8C, user interface 880 includes item description section 810, change item section 820, and a preference settings section 890. Item details section 810 and change item section 820 may include features similar to those described above in connection with user interface 800 of FIG. 8A or 8B. The type of items (e.g., suggested content) in item details section 810 may cause user interface 880 to present preference setting section 890.

Preference setting section 890 may include one or more content category (or genre) identifiers 892 with an input scale 894 and details option 896. Preference settings section 890 may also include an add/delete category option 898. Generally, preference setting section 890 may solicit user input to identify a personalized weighted mix of content categories over a particular period of time or continually. Content items (e.g., as listed in catalog server 222) may be tagged and categorized in one of several available categories. In one implementation, for example, content from content sources 292 may be required to have a category before a content item can be published by catalog server 222. Preference setting section 890 may allow a user to select an adjustable mix of content types among different content categories. Based on user input to preference setting section 890 and/or other user profile information (e.g., from profile server 230), content distribution network 130 (e.g., suggestion engine 250) may generate a playlist for a personalized channel (or a period of time within a personalized channel) that corresponds to the user input.

Content category identifiers 892 may include a content category, such as a genre or another classification (e.g., movies, sports, news, sit-coms, etc.), that can identify a type of content. Input scale 894 may include an indicator to allow a user to identify a weighting, a percent, or an amount of the particular content category. For example, as shown in FIG. 8C, input scale 894 may include a sliding scale between "more" and "less" to identify a user's preference for a particular content category. Details option 896 may open another user interface window (now shown) to indicate user preferences for a category with more particularity. Details option 896 may, for example, allow input to identify lengths (e.g., max./min.), content ratings, sub-genres, preference for live or pre-recorded content, etc., for a particular category identifier 892. Add/delete category option 898 may allow a user to include more or fewer content category identifiers 892 (and corresponding input scale 894 and details option 896) in preference setting section 890.

In one implementation, a user may modify content preferences for suggested content at any time using user interface 880, and content distribution network 130 (e.g., suggestion engine 250) can dynamically update the playlist for the personalized channel.

Although FIGS. 7-8C depict certain user interfaces for configuring a personalized channel, in other implementations, different user interfaces may be used that depict more, less, and/or different information than depicted in FIGS. 7-8C.

FIG. 9 is a flow diagram of an exemplary process 900 for configuring and presenting a personalized channel. In one implementation, process 900 may be performed by navigation device 110 or another user device 270. In other implementations, process 900 may be performed by navigation device 110, viewing device 120, and/or one or more devices from content distribution network 130.

Process 900 may include receiving an index of content items available for presentation (block 910) and presenting a user interface to configure a personalized channel plan (block 920). For example, application server 224 may provide a content index 610 to navigation device 110. Content index 610 may include, for example, items from catalog server 222 and/or content aggregator module 520. Navigation device 110 may receive content index 610, and the user of navigation device 110 may use personal channel manager application 400 (e.g., executing on navigation device 110) to configure a personalized channel using content items from content index 610. In another implementation, a user may access the content index via a web page from user device 270 that includes a user interface (e.g., such as user interface 700) to configure the personalized channel plan.

Process 900 may also include receiving user input to schedule the personalized channel plan from content items in the index (block 930) and storing the personalized channel plan in a local memory (block 940). For example, as described in connection with FIGS. 7-8B, a user may provide input into scheduling grid 710 to create a personalized channel plan. The personalized channel plan may be stored locally on navigation device 110. If the personalized channel plan is created using a web interface on a user device 270 that is different than navigation device 110, navigation device 110 may login to a user account to access and download the personalized channel plan.

Process 900 may further include sending, to a remote viewing device, presentation instructions for the personalized channel plan (block 950). For example, based on the schedule for the user's personalized channel, navigation device 110 may provide the content links 620 and/or web links 630 as plan instructions 640 to viewing device 120. Plan instructions 640 may include, for example, links to scheduled content and/or tuning instructions.

Figure 10:
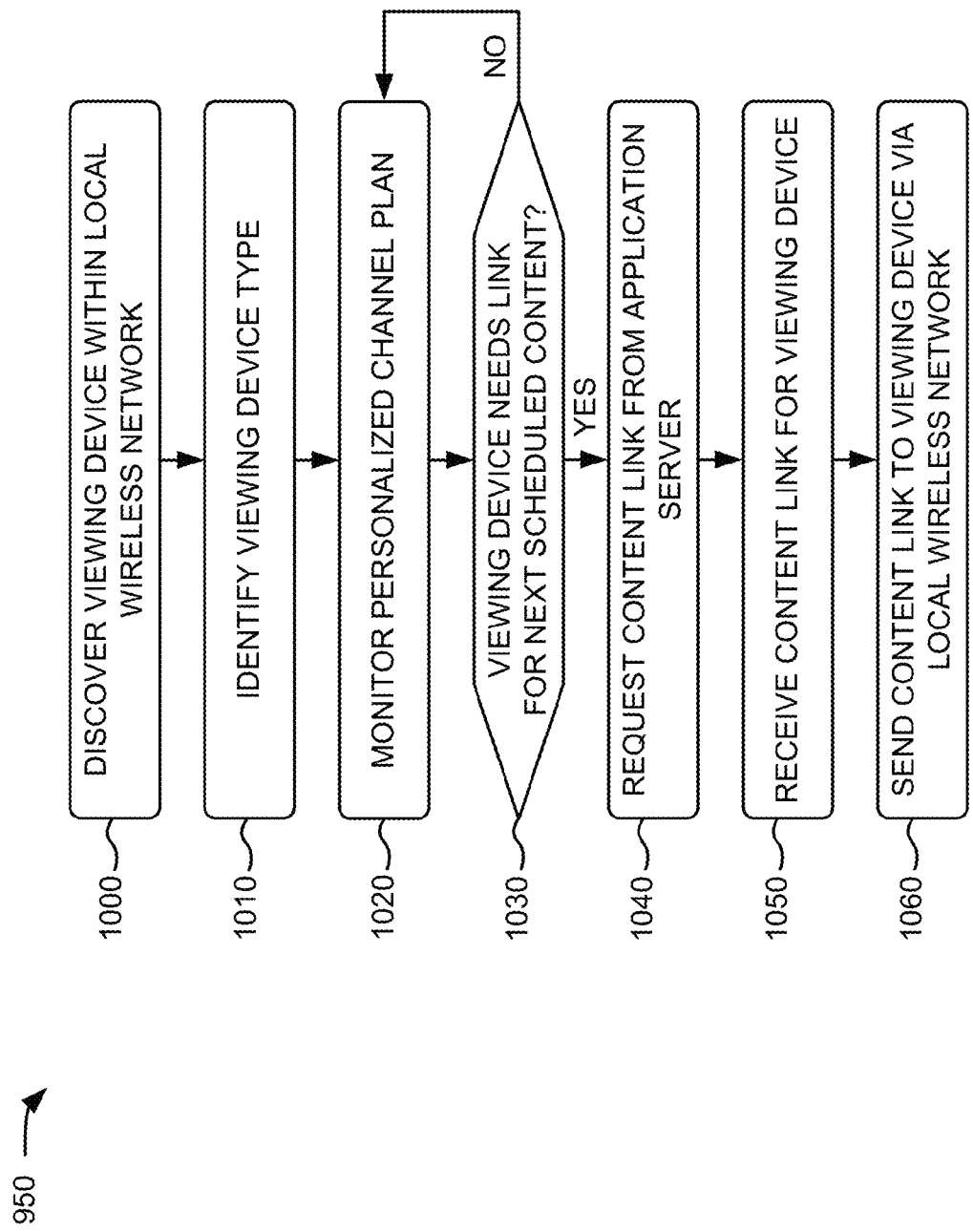

Process block 950 may include the process block shown in FIG. 10. Referring to FIG. 10, process block 950 may include discovering a viewing device within a local wireless network (block 1000), identifying the viewing device type (block 1010), and monitoring the personalized channel plan (block 1020). For example, navigation device 110 (e.g., device discovery module 490) may identify viewing devices 120 (e.g., devices in a user's home) that are available to present a personalized content schedule based on instructions from navigation device 110 and a type of viewing device 120. Navigation device 110 (e.g., display control module 470) may monitor the personalized content schedule to identify when changes to links/channels presented by viewing device 120 are required.

Process block 950 may also include determining if the viewing device needs a link for a next scheduled content item (block 1030). For example, navigation device 110 (e.g., display control module 470) may monitor the personalized content schedule and, depending on the type of content included in the current time slot of navigation interface 115, display control module 470 may determine if viewing device 120 is required to tune to a particular broadcast channel, load VOD content, or access a URL for web-based content. Alternatively, navigation device 110 (e.g., display control module 470) may determine that viewing device 120 has sufficient instructions/capacity to present the next content item in the personalized content schedule without additional instructions.

If the viewing device does not need a link for a next scheduled content item (block 1030—NO), the channel plan may continue to be monitored (block 1020). If the viewing device needs a link for a next scheduled content item (block 1030—YES), process block 950 may include requesting a content link from an application server (block 1040), receiving the content link for the viewing device (block 1050), and sending the content link to the viewing device via the local wireless network (block 1060). For example, navigation device 110 may request a link from application server 224, for a particular content item in a personalized content schedule. Application server 224 may provide content links 620 to navigation device 110 in a distributed manner. That is, at least some of content links 620 may not be defined/available within content delivery network 130 when channel plan 615 is initially sent to application server 224. Thus, navigation device 110 and application server 224 may perform multiple iterations of exchanging requests and content links 620 over time.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 9 and 10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
receiving, by a user device and from a network device, a content index of content items available for presentation;
presenting, by the user device, a user interface to configure a personalized channel plan, wherein the user interface includes a scheduling grid with a linear presentation of time slots for creating the personalized channel plan and a drag-and-drop interface to populate a content item selection from the content index into the scheduling grid;
receiving, by the user device and via the user interface, user input to configure the personalized channel plan, wherein the personalized channel plan includes content item selections from the content index, selected time slots for the content item selections, and a viewing device selection for presentation of selected content items, wherein the viewing device is different than the user device;
sending, by the user device and to an application server, the content item selections, a presentation schedule, and the viewing device selection for the personalized channel plan;
receiving, by the user device and from the application server, content links for the selected content items in the personalized channel plan, wherein at least some of the content links include tuning instructions or a uniform resource locator (URL) for a private managed network that provides guaranteed quality-of-service (QoS) levels for delivering the selected content items to the viewing device; and
sending, by the user device and to the viewing device, instructions for the personalized channel plan, wherein the instructions include the content links and cause the viewing device to obtain the selected content items and present the selected content items to the user at the selected time slots.

2. The method of claim 1, further comprising:
providing, by the viewing device and after the sending the instructions, a license request to retrieve a DRM license for one of the selected content items.

3. The method of claim 1, wherein the content links include a uniform resource locator (URL) for a network location to retrieve content formatted for a type of the viewing device.

4. The method of claim 1, wherein the selected content items include live linear broadcast content.

5. The method of claim 4, wherein the selected content items includes web-based content.

6. The method of claim 1, wherein the sending further comprises:
discovering the viewing device within a local wireless network; and
sending the instructions via the local wireless network.

7. The method of claim 1, wherein the content item selections include alternative content items for one of the time slots, and wherein the user input further includes instructions to selectively present one of the alternative content items.

8. The method of claim 1, wherein the user input further includes instructions to retrieve an automatically-suggested content item, for presentation during one of the selected time slots, based on a user profile.

9. The method of claim 8, wherein the instructions to retrieve the automatically-suggested content item include one or more user-selected criteria for the automatically-suggested content item.

10. The method of claim 9, wherein the one or more user-selected criteria for the automatically-suggested content item includes a content source, a duration, a genre, a keyword, or a content rating.

11. The method of claim 9, wherein the one or more user-selected criteria for the automatically-suggested content item includes weighted mix of different content categories.

12. A system, comprising:
a user device including:
a network interface to communicate with a network device and a viewing device that is different than the user device;
a memory for storing instructions; and
a processor configured to execute the instructions to:
receive, from the network device, a content index of content items available for presentation via a content distribution network;
present a user interface to configure a personalized channel plan, wherein the user interface includes a scheduling grid with a linear presentation of time slots for creating the personalized channel plan and a drag-and-drop interface to populate a content item selection from the content index into the scheduling grid;
receive, via the user interface, user input to configure the personalized channel plan, wherein the personalized channel plan includes content item selections from the content index, selected time slots for the content item selections, and a viewing device selection for presentation of selected content items;
send, to the network device, the content item selections, a presentation schedule, and the viewing device selection for the personalized channel plan;
receive, from the network device, content links for the selected content items in the personalized channel plan, wherein at least some of the content links include tuning instructions or a uniform resource locator (URL) for a private managed network that provides guaranteed quality-of-service (QoS) levels for delivering the selected content items to the viewing device; and send, to the viewing device, presentation instructions for the personalized channel plan, wherein the instructions include the content links and cause the viewing device to obtain the selected content items and present the selected content items to the user at the selected time slots.

13. The system of claim 12, wherein the viewing device further comprises:
a host application to receive and execute the presentation instructions.

14. The system of claim 12, wherein the content index includes items from television content, video-on-demand content, and web-based content.

15. The system of claim 12, wherein, when receiving the user input to schedule the personalized channel plan, the processor is further configured to:
receive user input to drag a title from the content index into the scheduling grid.

16. The system of claim 12, wherein the selected content items include live linear broadcast content and on-demand content.

17. The system of claim 12, wherein the viewing device includes one or more of:
a set-top box (STB);
a cable card; or
a smart television.

18. The system of claim 12, wherein the processor is further configured to execute the instructions to:
store, in the memory, the personalized channel plan.

19. A non-transitory computer-readable medium, storing instructions executable by one or more processors, the non-transitory computer-readable medium comprising one or more instructions to:
receive, from a network device, a content index of content items available for presentation via a content distribution network;
present a user interface to configure a personalized channel plan, wherein the user interface includes a scheduling grid with a linear presentation of time slots for creating the personalized channel plan and a drag-and-drop interface to populate a content item selection from the content index into the scheduling grid;
receive, via the user interface, user input to schedule the personalized channel plan, wherein the personalized channel plan includes content item selections from the content index, selected time slots for the content item selections, and a viewing device selection for presentation of selected content items, wherein the viewing device is different than the user device; on the viewing device; and
send, to the network device, the content item selections, a presentation schedule, and the viewing device selection for the personalized channel plan;
receive, from the network device, content links for the selected content items in the personalized channel plan, wherein at least some of the content links include tuning instructions or a uniform resource locator (URL) for a private managed network that provides guaranteed quality-of-service (QoS) levels for delivering the selected content items to the viewing device; and
provide presentation instructions for the personalized channel plan, wherein the instructions include the content links and cause the viewing device to obtain the selected content items and present the selected content items to the user at the selected time slots.

20. The non-transitory computer-readable medium of claim 19, further comprising one or more instructions to:
store the personalized channel plan.

* * * * *